US 12,416,362 B2

United States Patent
Feng

(10) Patent No.: US 12,416,362 B2
(45) Date of Patent: Sep. 16, 2025

(54) VALVE SEAT WITH CIRCUMFERENTIAL RIB

(71) Applicant: Mueller International, LLC, Atlanta, GA (US)

(72) Inventor: Xianhua Feng, Jingmen (CN)

(73) Assignee: Mueller International, LLC, Atlanta, GA (US)

( * ) Notice: Subject to any disclaimer, the term of this patent is extended or adjusted under 35 U.S.C. 154(b) by 418 days.

(21) Appl. No.: 17/780,164

(22) PCT Filed: May 6, 2022

(86) PCT No.: PCT/CN2022/091171
§ 371 (c)(1),
(2) Date: May 26, 2022

(87) PCT Pub. No.: WO2023/212918
PCT Pub. Date: Nov. 9, 2023

(65) Prior Publication Data
US 2023/0358316 A1    Nov. 9, 2023

(51) Int. Cl.
*F16K 1/226* (2006.01)

(52) U.S. Cl.
CPC .......... *F16K 1/2265* (2013.01); *F16K 1/2266* (2013.01)

(58) Field of Classification Search
CPC ..... F16K 1/2263; F16K 1/2265; F16K 1/2266
USPC .................................. 251/305–308, 362, 173
See application file for complete search history.

(56) References Cited

U.S. PATENT DOCUMENTS

| | | | | |
|---|---|---|---|---|
| 3,394,915 A | * | 7/1968 | Gachot | F16K 27/067 251/315.04 |
| 3,650,508 A | * | 3/1972 | Kosmala | F16K 5/0673 251/173 |
| 4,331,319 A | * | 5/1982 | Summers | F16K 1/2266 251/173 |
| 4,513,946 A | * | 4/1985 | Priese | F16K 1/2285 251/173 |
| 4,582,080 A | * | 4/1986 | Stock | F16K 1/2266 251/173 |

(Continued)

FOREIGN PATENT DOCUMENTS

| | | |
|---|---|---|
| CN | 105765278 A | 7/2016 |
| CN | 207975265 U | 10/2018 |

(Continued)

OTHER PUBLICATIONS

Feng, Xianhua; International Search Report and Written Opinion for PCT/CN2022/091171, filed May 6, 2022, mailed Jan. 19, 2023, 10 pgs.

(Continued)

*Primary Examiner* — John Bastianelli
(74) *Attorney, Agent, or Firm* — Taylor Duma LLP

(57) ABSTRACT

A valve seat includes an annular sealing body defining an inner seat surface and an outer seat surface, the inner seat surface defining an annular seating portion configured to seat with a valve member; and a circumferential sealing rib extending circumferentially about the annular sealing body, the circumferential sealing rib defining a gooseneck portion coupled to the annular sealing body and a bulbous portion coupled to the gooseneck portion opposite the annular sealing body.

19 Claims, 13 Drawing Sheets

(56) References Cited

U.S. PATENT DOCUMENTS

| | | | | |
|---|---|---|---|---|
| 4,623,121 A | * | 11/1986 | Donnelly | F16K 1/2266 |
| | | | | 251/305 |
| 10,184,567 B2 | * | 1/2019 | Hartman | F16K 1/2261 |
| 10,184,568 B2 | * | 1/2019 | Lenhert | F16K 1/2263 |
| 10,400,897 B2 | * | 9/2019 | Geyer | B23P 15/001 |

FOREIGN PATENT DOCUMENTS

| | | |
|---|---|---|
| CN | 109519552 A | 3/2019 |
| CN | 214367814 U | 10/2021 |
| JP | 11157438 A | 6/1999 |
| WO | 2023212918 | 11/2023 |

OTHER PUBLICATIONS

Wang, Xi; International Preliminary Report on Patentability (under Chapter I) for PCT Application No. PCT/CN2022/091171, filed May 6, 2022, mailed Nov. 21, 2024, 6 pgs.

* cited by examiner

VALVE SEAT WITH CIRCUMFERENTIAL RIB

CROSS-REFERENCE TO RELATED APPLICATIONS

This application claims priority to PCT Application No. CN2022/091171, filed May 6, 2022, which is hereby incorporated by reference herein in its entirety.

TECHNICAL FIELD

This disclosure relates to valves. More specifically, this disclosure relates to a high performance valve seat comprising a circumferential rib.

BACKGROUND

Valves often have a valve member housed within a valve body, and a valve seat positioned between the valve member and the valve body to form a seal when the valve is placed in a closed configuration. Examples of common valve members include the ball of a ball valve, the disc of a butterfly valve, and the gate of a gate valve. The seat often is made of a resilient member that elastically deforms due to contact with the valve member to form the seal between the valve member and the seat. However, current valve seats are prone to failure, allowing fluid or gas to leak across the valve. Additionally, should the valve seat and/or the valve member become off-centered, abnormal wear on the valve seat can reduce the life cycle of the valve. Furthermore, opening and closing torques required to operate the valve often are undesirably high.

SUMMARY

It is to be understood that this summary is not an extensive overview of the disclosure. This summary is exemplary and not restrictive, and it is intended to neither identify key or critical elements of the disclosure nor delineate the scope thereof. The sole purpose of this summary is to explain and exemplify certain concepts of the disclosure as an introduction to the following complete and extensive detailed description.

Disclosed is a valve seat comprising an annular sealing body defining an inner seat surface and an outer seat surface, the inner seat surface defining an annular seating portion configured to seat with a valve member; and a circumferential sealing rib extending circumferentially about the annular sealing body, the circumferential sealing rib defining a gooseneck portion coupled to the annular sealing body and a bulbous portion coupled to the gooseneck portion opposite the annular sealing body.

Also disclosed a valve comprising a valve body defining a main valve bore; a valve member disposed within the main valve bore and movable between an open orientation and a closed orientation, the valve member defining a seat engagement surface; a seat retainer mounted to the valve body; and a valve seat comprising an annular sealing body and a circumferential sealing rib, the circumferential sealing rib compressed between the valve body and the seat retainer, the annular sealing body defining an inner seat surface configured to seal with the seat engagement surface in the closed orientation.

Additionally, disclosed is a valve seat comprising a sealing body defining a seating portion configured to seat with a valve member; and a sealing rib extending circumferentially about the annular sealing body, the sealing rib defining a bulbous portion.

Various implementations described in the present disclosure may include additional systems, methods, features, and advantages, which may not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims. The features and advantages of such implementations may be realized and obtained by means of the systems, methods, features particularly pointed out in the appended claims. These and other features will become more fully apparent from the following description and appended claims, or may be learned by the practice of such exemplary implementations as set forth hereinafter.

BRIEF DESCRIPTION OF THE DRAWINGS

The features and components of the following figures are illustrated to emphasize the general principles of the present disclosure. The drawings are not necessarily drawn to scale. Corresponding features and components throughout the figures may be designated by matching reference characters for the sake of consistency and clarity.

DETAILED DESCRIPTION

Figure 1:
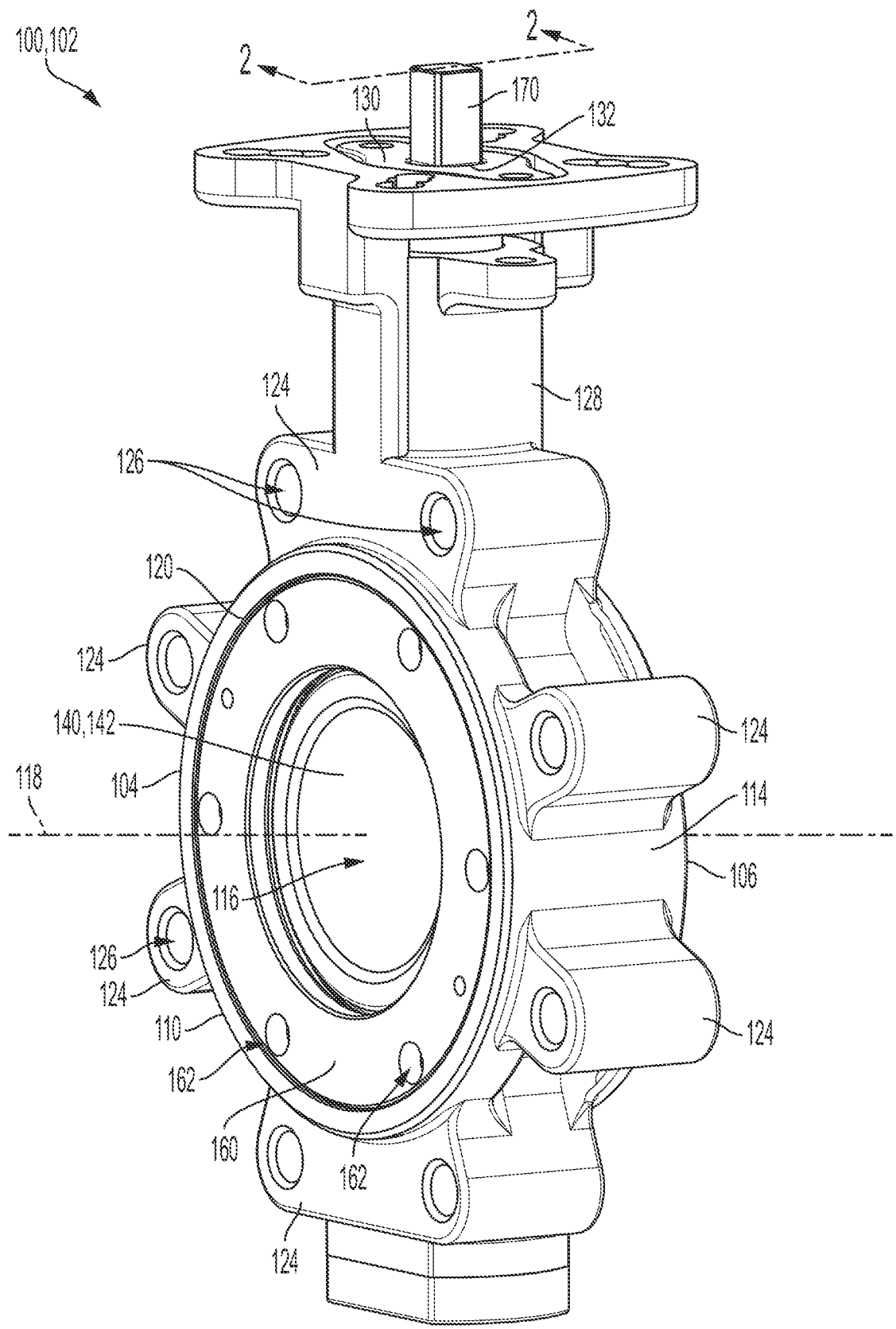
FIG. 1 is a perspective view of a valve comprising a valve member, a valve body, a seat retainer, and a high performance valve seat, in accordance with one aspect of the present disclosure.

The present disclosure can be understood more readily by reference to the following detailed description, examples, drawings, and claims, and the previous and following description. However, before the present devices, systems, and/or methods are disclosed and described, it is to be understood that this disclosure is not limited to the specific devices, systems, and/or methods disclosed unless otherwise specified, and, as such, can, of course, vary. It is also to be understood that the terminology used herein is for the purpose of describing particular aspects only and is not intended to be limiting.

The following description is provided as an enabling teaching of the present devices, systems, and/or methods in its best, currently known aspect. To this end, those skilled in the relevant art will recognize and appreciate that many changes can be made to the various aspects of the present devices, systems, and/or methods described herein, while still obtaining the beneficial results of the present disclosure. It will also be apparent that some of the desired benefits of the present disclosure can be obtained by selecting some of the features of the present disclosure without utilizing other features. Accordingly, those who work in the art will recognize that many modifications and adaptations to the present disclosure are possible and can even be desirable in certain circumstances and are a part of the present disclosure. Thus, the following description is provided as illustrative of the principles of the present disclosure and not in limitation thereof.

As used throughout, the singular forms "a," "an" and "the" include plural referents unless the context clearly dictates otherwise. Thus, for example, reference to "an element" can include two or more such elements unless the context indicates otherwise.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

For purposes of the current disclosure, a material property or dimension measuring about X or substantially X on a particular measurement scale measures within a range between X plus an industry-standard upper tolerance for the specified measurement and X minus an industry-standard lower tolerance for the specified measurement. Because tolerances can vary between different materials, processes and between different models, the tolerance for a particular measurement of a particular component can fall within a range of tolerances.

As used herein, the terms "optional" or "optionally" mean that the subsequently described event or circumstance can or cannot occur, and that the description includes instances where said event or circumstance occurs and instances where it does not.

The word "or" as used herein means any one member of a particular list and also includes any combination of members of that list. Further, one should note that conditional language, such as, among others, "can," "could," "might," or "may," unless specifically stated otherwise, or otherwise understood within the context as used, is generally intended to convey that certain aspects include, while other aspects do not include, certain features, elements and/or steps. Thus, such conditional language is not generally intended to imply that features, elements and/or steps are in any way required for one or more particular aspects or that one or more particular aspects necessarily include logic for deciding, with or without user input or prompting, whether these features, elements and/or steps are included or are to be performed in any particular aspect.

Disclosed are components that can be used to perform the disclosed methods and systems. These and other components are disclosed herein, and it is understood that when combinations, subsets, interactions, groups, etc. of these components are disclosed, that while specific reference of each various individual and collective combinations and permutations of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific aspect or combination of aspects of the disclosed methods.

Disclosed is a valve seat and associated methods, systems, devices, and various apparatus. The valve seat can comprise a sealing body and a sealing rib extending from the sealing body. It would be understood by one of skill in the art that the disclosed valve seat is described in but a few exemplary aspects among many. No particular terminology or description should be considered limiting on the disclosure or the scope of any claims issuing therefrom.

FIG. 1 illustrates a valve 100 according to an example aspect of the present disclosure. In the present aspect, the valve 100 can be a butterfly valve 102. However, in other aspects, the valve 100 can be any other suitable valve, including but not limited to, a ball valve, a gate valve, or the like. The butterfly valve 102 can define a first end 104 and a second end 106 opposite the first end 104. According to example aspects, the butterfly valve 102 can comprise a valve body 110, a valve member 140, and a high performance valve seat 250 (shown in FIG. 2). The butterfly valve 102 can also comprise a seat retainer 160 configured to retain the high performance valve seat 250 on the valve body 110. As shown, the butterfly valve 102 can further comprise a valve shaft 170 engaged with the valve member 140 and configured to move the valve member 140 between an open orientation and a closed orientation (shown).

The valve body 110 can extend from the first end 104 to the second end 106, and can define an inner body surface 212 (shown in FIG. 2) and an outer body surface 114. Each of the inner body surface 212 and the outer body surface 114 can be substantially cylindrical in the present aspect. The inner body surface 212 can define a main valve bore 116 extending through the valve body 110 from the first end 104 to the second end 106. The valve body 110 can define a first bore opening 120 at the first end 104 of the valve 100 and a second bore opening 222 (shown in FIG. 2) at the second end 106 of the valve 100. Each of the first bore opening 120 and the second bore opening 222 can allow access to the main valve bore 116. The main valve bore 116 can define a main bore axis 118 extending centrally therethrough.

In example aspects, the valve body 110 can further comprise one or more fastener lugs 124 extending radially outward from the outer body surface 114. One or more mounting fastener holes 126 can be formed through each of the fastener lugs 124, and a fastener, such as a bolt for example and without limitation, can extend through each corresponding mounting fastener hole 126 to mount the butterfly valve 102 to a surrounding structure, such as a pipeline. In other aspects, the valve body 110 can comprise a first annular flange and the first end 104 and a second annular flange at the second end 106, and the mounting fastener holes 126 can be formed through the first and second annular flanges. According to example aspects, the valve body 110 can be formed by casting. For example, the valve body 110 can be formed from cast iron in example aspects. In other aspects, the valve body 110 can comprise any other suitable alloy or material, and can be formed by any suitable manufacturing process.

According to example aspects, an annular seat retainer 160 can be disposed within the main valve bore 116 and can be coupled to the valve body 110. The annular seat retainer can comprise a metal material in example aspects, such as, for example, steel. More specifically, in some aspects, the metal material can be WCB, CF8M, NAB, or the like. In other aspects, the annular seat retainer can comprise any other suitable metal or non-metal material. For example, in the present aspect, an inner body flange 214 (shown in FIG. 2) of the valve body 110 can extend radially inward from the inner body surface 212, and the annular seat retainer 160 can be coupled to the inner body flange 214. The annular seat retainer 160 can define one or more retainer fastener holes 162 formed therethrough. A fastener, such as a bolt for example and without limitation, can extend through each corresponding retainer fastener hole 162 and can engage the inner body flange 214 to couple the annular seat retainer 160 thereto. The annular seat retainer 160 can be disposed adjacent to the first end 104 of the valve 100. However, in other aspects, the annular seat retainer 160 can be disposed adjacent to the second end 106 of the valve 100, or at any suitable location within the main valve bore 116 between the first end 104 and the second end 106. At least a portion of the high performance valve seat 250 can be sandwiched between the seat retainer 160 and the inner body flange 214, as described in further detail below, to retain the high performance valve seat 250 on the valve body 110.

According to example aspects, the valve body 110 can further comprise a valve neck 128 extending from an upper one of the fastener lugs 124. The butterfly valve 102 can comprise an upper gland flange 130 and a packing gland 234 (shown in FIG. 2) recessed within an upper body cavity 236 (shown in FIG. 2) of the valve neck 128. As shown, the upper gland flange 130 can define a gland opening 132 configured to receive the valve shaft 170 therethrough. In example aspects, the upper gland flange 130 can be configured for mounting a valve actuator thereon, and the valve actuator can drive the movement of the valve member 140 between the open and closed orientations. The valve actuator can be, for example, a quarter-turn manual actuator, a gear box, or a motor, for example and without limitation. According to example aspects, mounting the valve actuator to the upper gland flange 130 can compress the packing gland 234 between the upper gland flange 130 and the valve body 110, thereby energizing the packing gland 234.

The valve shaft 170 can extend vertically through the valve body 110 and the main valve bore 116, relative to the orientation shown. The valve shaft 170 can further extend through the valve member 140. The valve member 140 can be a butterfly disc 142 in the present aspect. As shown, the valve member 140 can be positioned within the main valve bore 116. The valve member 140 is shown in the closed orientation, wherein the valve member 140 can seal with the high performance valve seat 250, as described in further detail below. In the closed orientation, the valve member 140 can block the main valve bore 116 and can prohibit fluid flow therethrough. The valve member 140 can be rotated about and between the open and closed orientations, respectively. In the open orientation, the valve member 140 can be disposed substantially sideways within the main valve bore 116, allowing fluid to pass around the valve member 140 and through the main valve bore 116. The valve shaft 170 can be fixedly coupled to the valve member 140, such that rotating the valve shaft 170, such as with the valve actuator, can rotate the valve member 140 about and between the open orientation and the closed orientation. In example aspects, the valve member 140 can comprise a substantially rigid material. For example, the valve member 140 can comprise a metal material in some aspects, such as, for example and without limitation, CF8M, NAB, MONEL, WCB, iron (including ductile iron), or the like. In other aspects, the valve member 140 can comprise any other suitable material.

Figure 2:
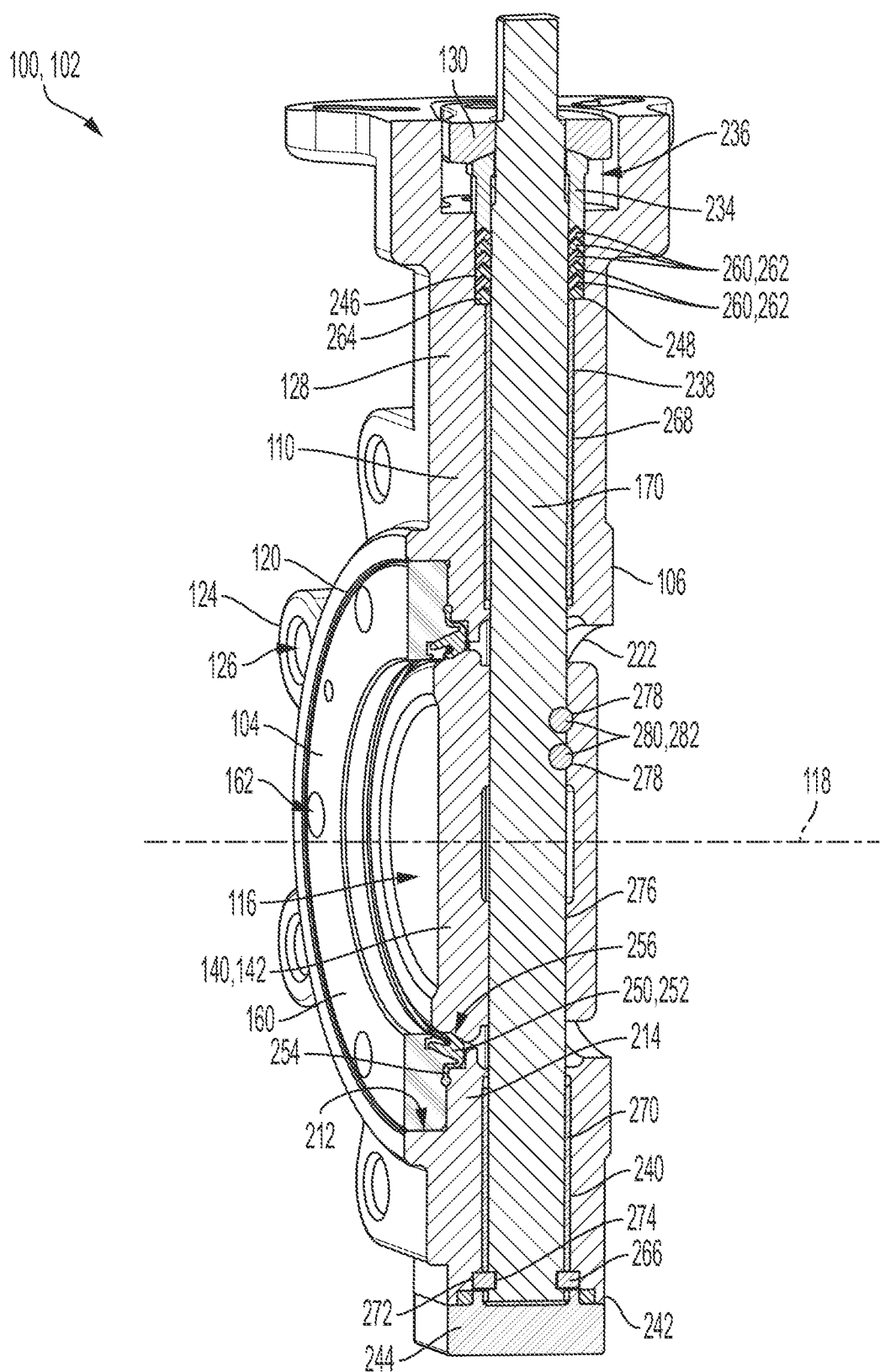
FIG. 2 is a cross-sectional view of the valve of FIG. 1, taken along line 2-2 shown in FIG. 1.

FIG. 2 illustrates a cross-sectional view of the butterfly valve 102 taken along line 2-2 in FIG. 1. As shown, the butterfly valve 102 can comprise the valve body 110, the seat retainer 160, the valve member 140, the valve shaft 170, and the high performance valve seat 250. The upper gland flange 130 and the packing gland 234 can be disposed within the upper body cavity 236 of the valve neck 128. An upper shaft channel 238 can extend through the valve body 110 from the upper body cavity 236 to the main valve bore 116, and a lower shaft channel 240 can extend through the valve body 110 from a lower end 242 of the butterfly valve 102 to the main valve bore 116. A lower channel cap 244 can be secured to the valve body 110 at the lower end 242. The lower shaft channel 240 can be aligned with the upper shaft channel 238, and the valve shaft 170 can extend through the upper body cavity 236 and the upper shaft channel 238, across the main valve bore 116, and into the lower shaft channel 240. Moreover, the valve shaft 170 can be configured to rotate relative to the valve body 110 in order to rotate the valve member 140 about and between the open and closed orientations.

In example aspects, the upper shaft channel 238 can define a widened portion 246 extending into the valve neck 128 from the upper body cavity 236. A diameter of the widened portion 246 can be greater than a diameter of the upper shaft channel 238 between the widened portion 246 and the main valve bore 116. One or more packings 260 can be received within the widened portion 246. For example, in the present aspect, a plurality of cup and cone-style packings 262 can be stacked and mounted on the valve shaft 170 within the widened portion 246 and can be configured to seal the valve shaft 170 with the valve body 110. The plurality of cup and cone-style packings 262 can allow for even compression against the valve shaft 170. In example aspects, the cup and cone-style packings 262 can comprise PTFE polytetrafluoroethylene). However, in other aspects, the packing(s) 260 can be of any suitable type known in the art and/or can comprise any other suitable material, including but not limited to, graphite. According to example aspects, the packings 260 can be disposed between the packing gland 234 and an upper retaining ring 264. The upper retaining ring 264 can be mounted on the valve shaft 170 and can abut a shoulder 248 of the widened portion 246, as shown.

The butterfly valve 102 can further comprise an upper bearing 268 and a lower bearing 270 configured to facilitate the rotation of the valve shaft 170 within the upper and lower shaft channels 238,240. The upper bearing 268 can be mounted on the valve shaft 170 within the upper shaft channel 238, such that the upper bearing 268 can be disposed between the upper retaining ring 264 and the main valve bore 116. Similarly, the lower bearing 270 can be mounted on the valve shaft 170 within the lower shaft channel 240, such that the lower bearing 270 can be disposed between a lower retaining ring 266 and the main valve bore 116. According to example aspects, as shown, the lower retaining ring 266 can be disposed within a lower channel groove 272 of the lower shaft channel 240 and a lower shaft groove 274 of the valve shaft 170, adjacent to the lower channel cap 244.

According to example aspects, the valve member 140 (i.e., the butterfly disc 142) can define a disc bore 276 through which the valve shaft 170 can extend, and the valve shaft 170 can be fixedly coupled to the butterfly disc 142. As shown, a pair of tangential tapered holes 278 can be machined on a leading edge of the valve shaft 170 and on the disc bore 276. A pin 280, such as a taper pin 282 for example and without limitation, can be received in each of the tangential tapered holes 278. To fixedly secure the valve shaft 170 to the butterfly disc 142, each of the taper pins 282 can be welded to each of the valve shaft 170 and the butterfly disc 142 within the corresponding tangential tapered holes 278. In other aspects, the butterfly valve 102 can comprise more or fewer of the tangential tapered holes 278 and the pins 280. In other aspects, the valve shaft 170 can be fixedly coupled to the valve member 140 by any other suitable fastener or fastening technique known in the art.

In example aspects, the annular seat retainer 160 can be substantially disposed within the main valve bore 116 at or near the first end 104 of the valve 100. The inner body flange 214 of the valve body 110 can extend radially inward from the inner body surface 212, and the annular seat retainer 160 can be coupled to the inner body flange 214. At least a portion of the high performance valve seat 250 can be sandwiched between the seat retainer 160 and the inner body flange 214, as shown, to retain the high performance valve seat 250 on the valve body 110. For example, in the present aspect, the high performance valve seat 250 can comprise an annular sealing body 252 and a circumferential sealing rib 254 extending circumferentially about the annular sealing body 252. The circumferential sealing rib 254 can be compressed between the seat retainer 160 and the inner body flange 214 of the valve body 110. Furthermore, the valve member 140 (i.e., the butterfly disc 142) can engage and seal with an inner seat surface 256 the annular sealing body 252 in the closed orientation, as described in additional detail below. According to example aspects, the high performance valve seat 250 can comprise relatively inflexible material, such as PTFE (i.e., polytetrafluoroethylene). In other aspects, the high performance valve seat 250 can comprise RTFE (reinforced PTFE), MRTFE, UHMWPE, or the like. In other aspects, the high performance valve seat 250 can comprise a combination of materials, such as PTFE & EPDM, PTFE & BUNA, PTFE & VITON, or the like, or any other suitable resilient, semi-resilient, or inflexible material or combination of materials known in the art. In some aspects, the valve seat 250 can comprise a combination of metal and non-metal materials, such as PTFE & 316SS, RPTFE & Inconel, or the like.

Figure 3A:
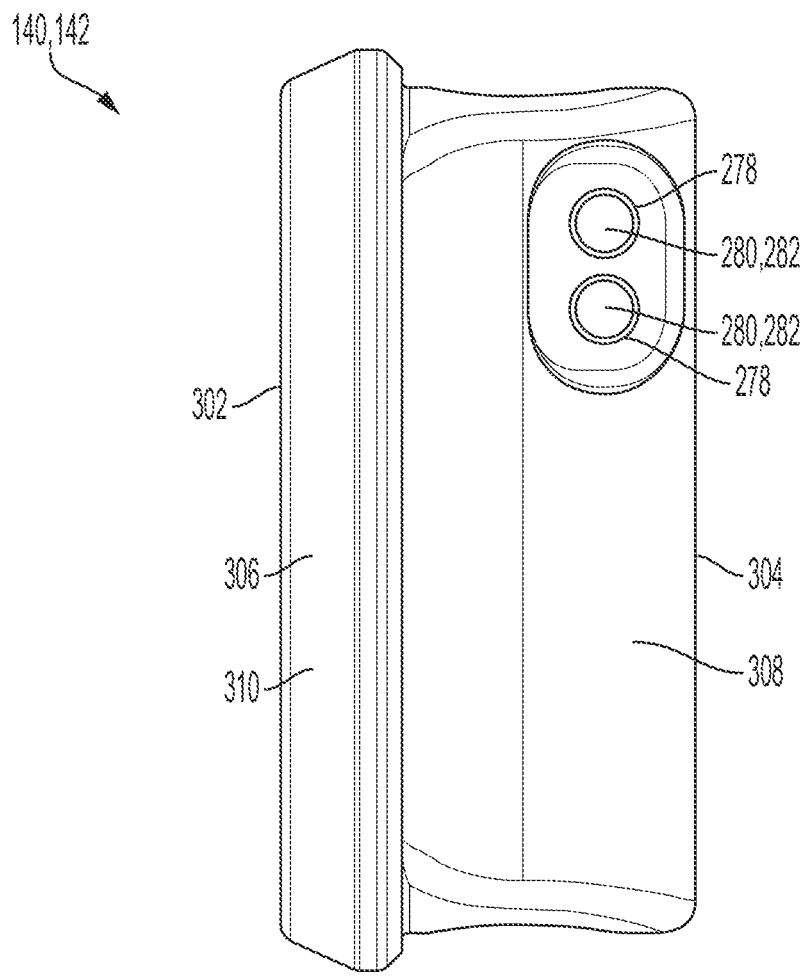
FIG. 3A is a right-side view of the valve member of FIG. 1.

FIG. 3A illustrates the valve member 140 (i.e., the butterfly disc 142) in accordance with an example aspect of the present disclosure. As shown, the butterfly disc 142 can define a first disc end 302 and a second disc end 304 opposite the first disc end 302. The butterfly disc 142 can generally define a seat engagement portion 306 formed at or near the first disc end 302 and a shaft engagement portion 308 extending from the seat engagement portion 306 and formed at or near the second disc end 304. The seat engagement portion 306 of the butterfly disc 142 can define an annular seat engagement surface 310, which can be configured to seal with the inner seat surface 256 of the high performance valve seat 250 (both shown in FIG. 2). In example aspects, the annular seat engagement surface 310 can define a substantially frustoconical shape, wherein a diameter of the annular seat engagement surface 310 can taper axially outwards, relative to the main bore axis 118 (shown in FIG. 1) in a direction towards the second disc end 304. Furthermore, according to example aspects, the annular seat engagement surface 310 can be substantially convex. Specifically, the annular seat engagement surface 310 can be a spherical zone in the present aspect. In geometry, a spherical segment is the solid formed by cutting a sphere, or ball, with a pair of parallel planes. A spherical zone is the surface defined by the spherical segment.

Figure 3B:
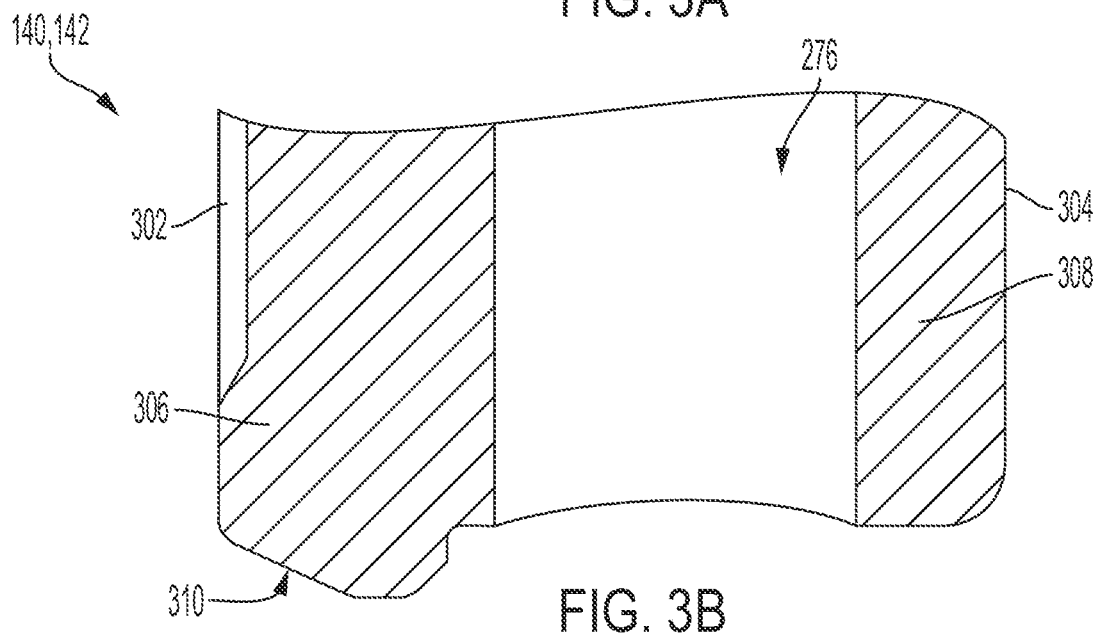
FIG. 3B is a cross-sectional view showing a lower portion of the valve member of FIG. 3A, taken along line 2-2 shown in FIG. 1.

As shown in FIG. 3B, which illustrates a cross-sectional view of a lower portion of the butterfly disc 142, the shaft engagement portion 308 of the butterfly disc 142 can define the disc bore 276, which can be configured to receive the valve shaft 170 (shown in FIG. 1) therethrough.

Figure 4:
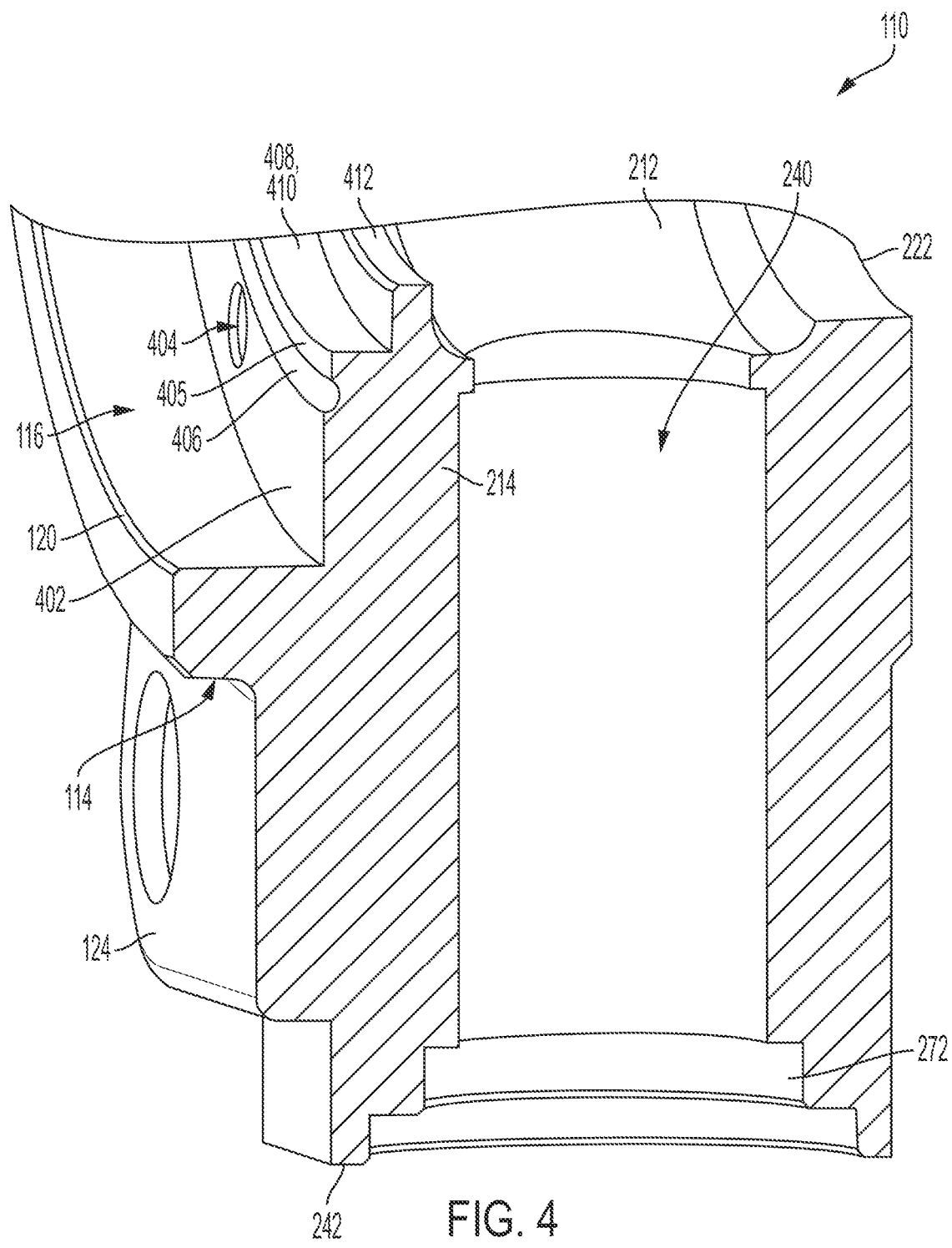
FIG. 4 is a cross-sectional view showing a lower portion of the valve body of FIG. 1, taken along line 2-2 shown in FIG. 1.

FIG. 4 illustrates a cross-sectional view of a lower portion of the valve body 110. As shown, the valve body 110 can define the inner body surface 212 and the outer body surface 114. The inner body surface 212 can define the main valve bore 116. The first bore opening 120 and the second bore opening 222 can allow access to the main valve bore 116. The lower shaft channel 240 can extend through the valve body 110 from the inner body surface 212 to lower end 242 of the butterfly valve 102 (shown in FIG. 1). Example aspects of the lower shaft channel 240 can define the lower channel groove 272, within which the lower retaining ring 266 (shown in FIG. 2) can be disposed. Moreover, the valve body 110 can define the inner body flange 214 extending radially inward from the inner body surface 212. The inner body flange 214 can be disposed adjacent to the lower shaft channel 240, between the lower shaft channel 240 and first bore opening 120.

The inner body flange 214 can define an annular front flange surface 402, as shown. One or more flange fastener holes 404 can be formed through the front flange surface 402. Each of the flange fastener holes 404 can be aligned with a corresponding one of the retainer fastener holes 162 (shown in FIG. 1), and a corresponding one of the fasteners can extend through each corresponding retainer fastener hole 162 and flange fastener hole 404 to couple the annular seat retainer 160 (shown in FIG. 1) to the inner body flange 214. The inner body flange 214 can further define a top flange end 408. The top flange end 408 can define a top flange surface 410, and an annular flange rib 412 can extend radially inward from the top flange surface 410. In example aspects, the top flange surface 410 can extend axially between the front flange surface 402 and the flange rib 412, as shown. According to example aspects, the front flange surface 402 can further define an annular axially-indented body region 405 extending radially outward from the top flange surface 410, and an annular body groove 406 connected to the axially-indented body region 405, distal to the top flange surface 410. The annular body groove 406 can define a substantially semi-circular cross-section in the present aspect.

Figure 5A:
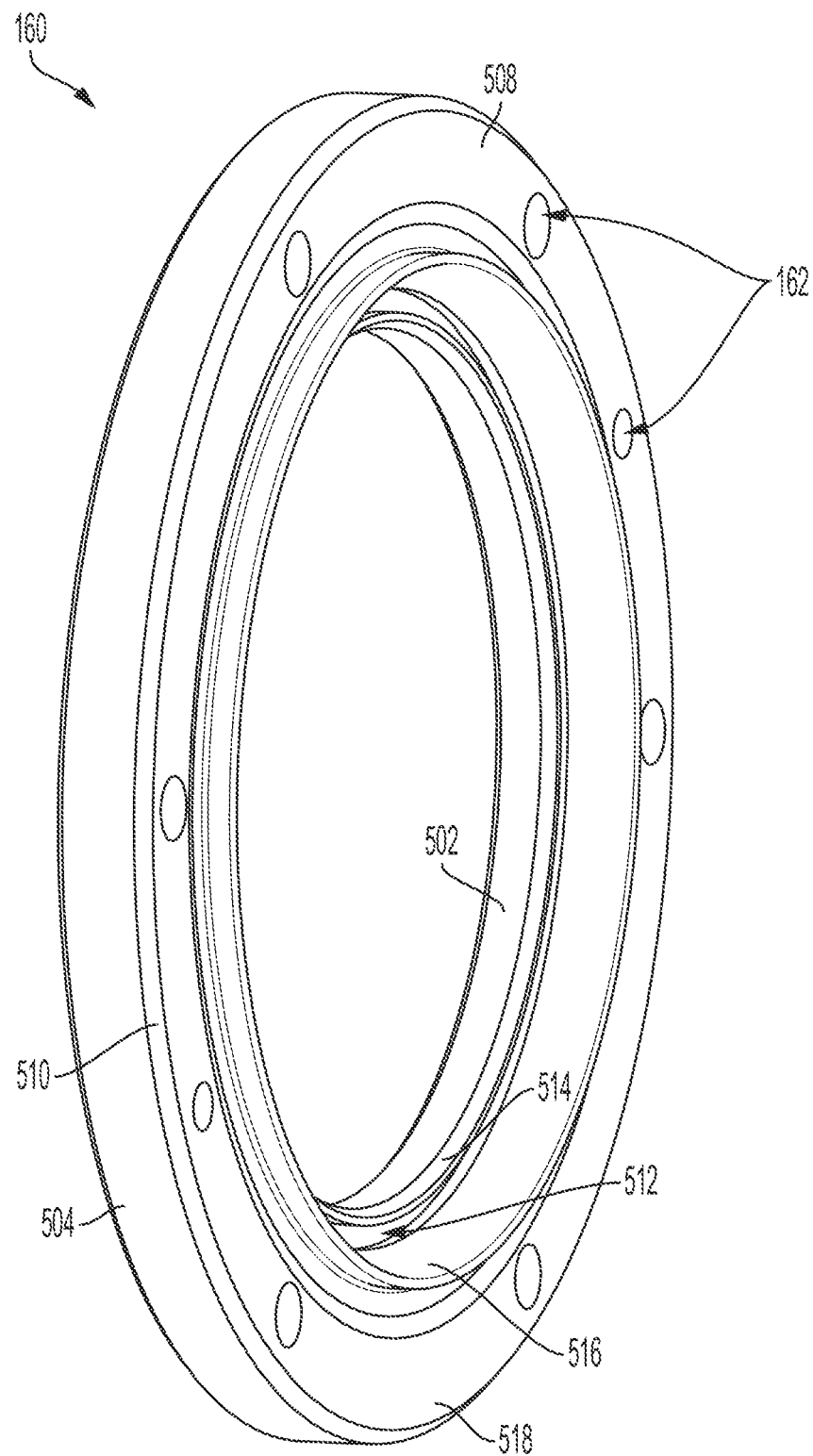
FIG. 5A is a perspective view of the seat retainer of FIG. 1.
Figure 5B:
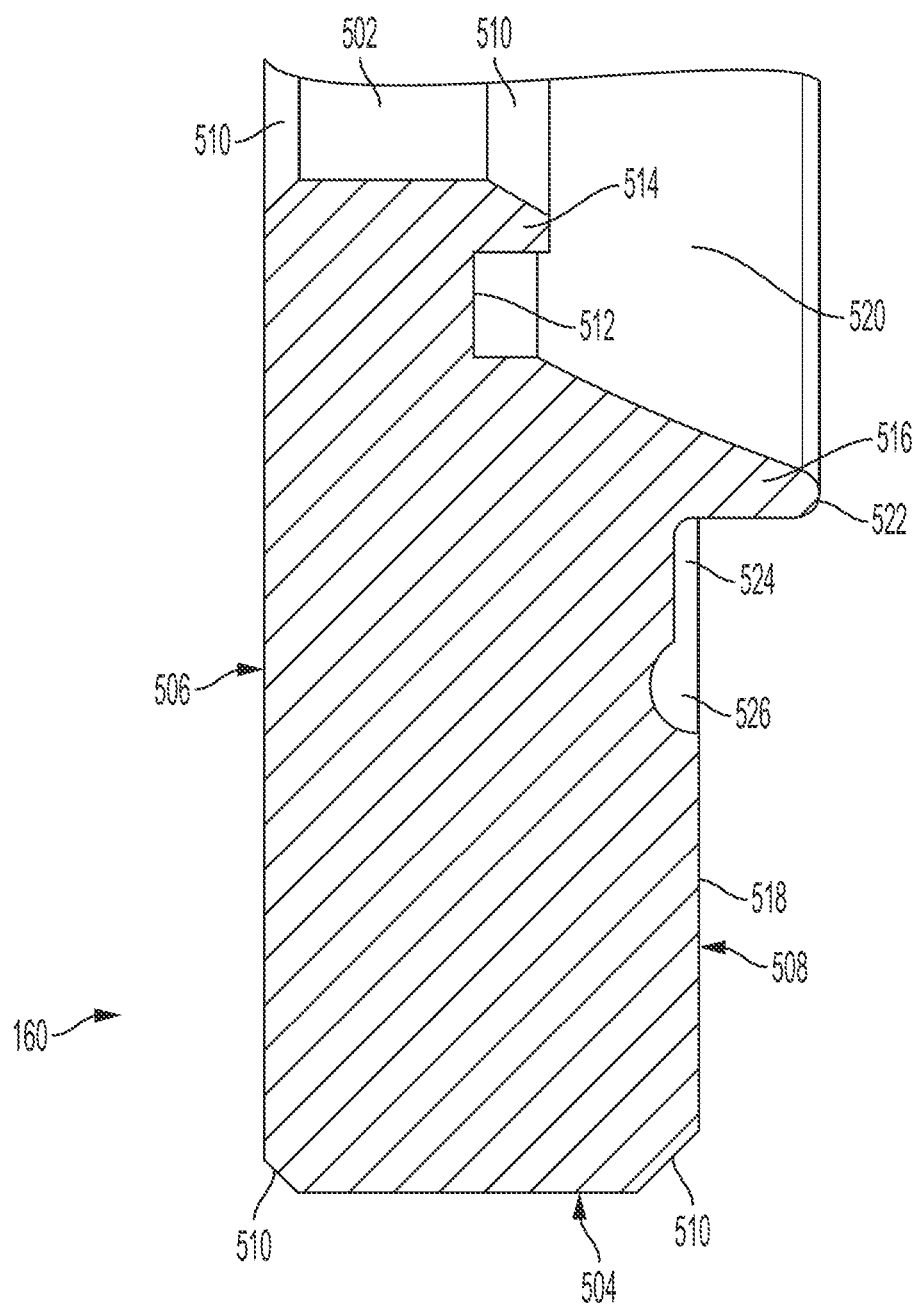
FIG. 5B is a cross-sectional view showing a lower portion of the seat retainer of FIG. 1, taken along line 2-2 shown in FIG. 1.

FIG. 5A illustrates the annular seat retainer 160 and FIG. 5B illustrates a cross-sectional view of a lower portion the annular seat retainer 160, in accordance with an example aspect of the present disclosure. Referring to FIG. 5A, the annular seat retainer 160 can define an inner retainer surface 502, an outer retainer surface 504, a front retainer surface 506 (shown in FIG. 5B), and a rear retainer surface 508. In some aspects, corners 510 are defined between intersecting ones of the inner retainer surface 502, the outer retainer surface 504, the front retainer surface 506, and the rear retainer surface 508. Each corner 510 can be a chamfered corner 510. An annular upper notch 512 can be formed in the rear retainer surface 508 proximate to the inner retainer surface 502. The upper notch 512 can at least partially define an annular inner retainer flange 514 at the inner retainer surface 502 and an annular outer retainer flange 516 opposite the annular inner retainer flange 514. Each of the upper and outer retainer flange 516s can extend axially away from the front retainer surface 506. In example aspects, a substantially perpendicular portion 518 of the rear retainer surface 508 can extend substantially radially inward from the outer retainer surface 504 to the outer retainer flange 516.

Referring now to FIG. 5B, in example aspects, the outer retainer flange 516 can define an angled upper flange surface 520. For example, the angled upper flange surface 520 can be angled radially outward generally from the upper notch 512 to a distal flange end 522 of the outer retainer flange 516. As shown, the distal flange end 522 of the outer retainer flange 516 can extend rearwardly beyond the substantially perpendicular portion 518. Furthermore, according to example aspects, the angled upper flange surface 520 can be substantially convex. Specifically, the angled upper flange surface 520 can be a spherical zone in the present aspect. In example aspects, the substantially perpendicular portion 518 of the rear retainer surface 508 can define an annular axially-indented retainer region 524 extending radially outward from the outer retainer flange 516 and an annular retainer groove 526 connected to the axially-indented retainer region 524, distal to the outer retainer flange 516. The annular retainer groove 526 can define a substantially semi-circular cross-section in the present aspect.

Figure 6A:
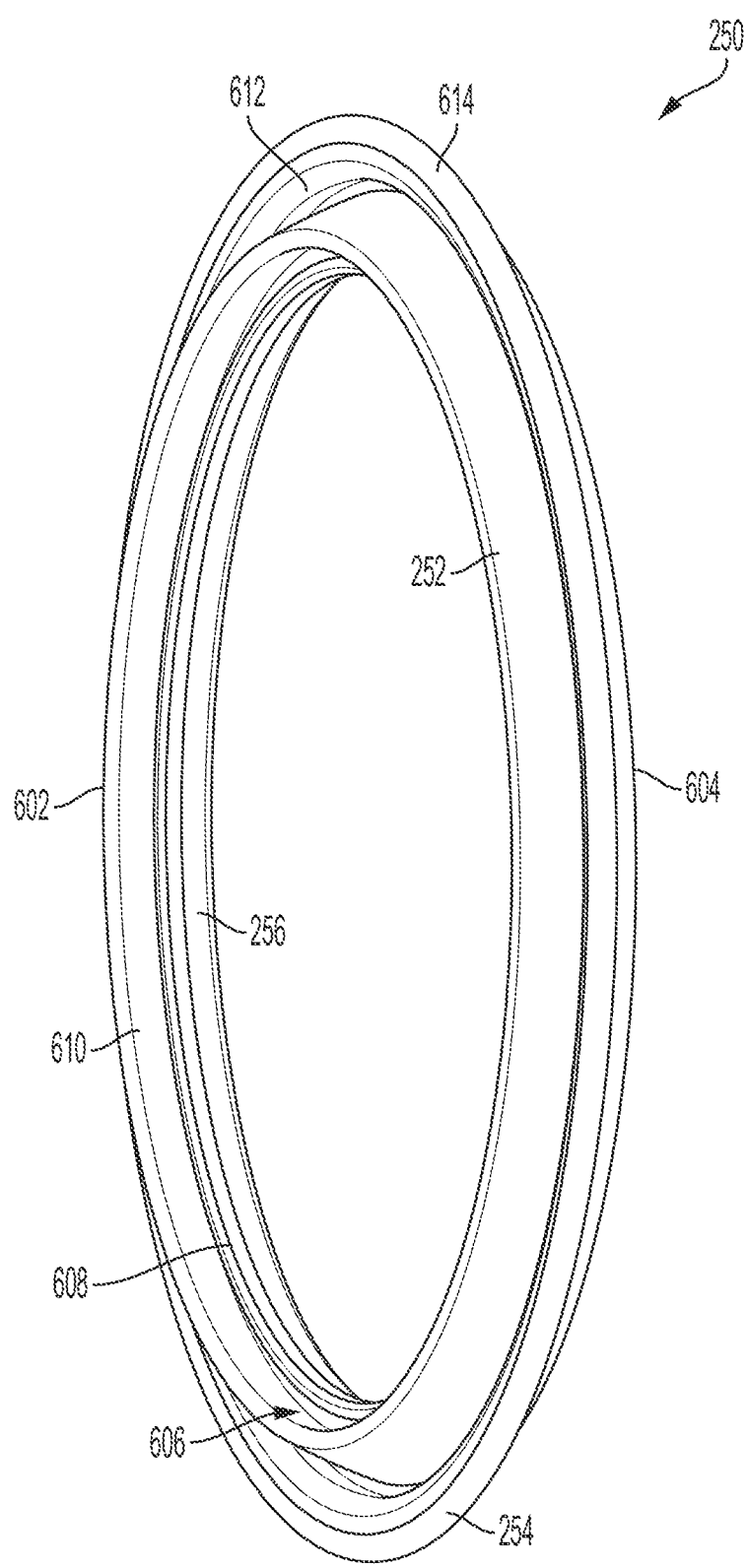
FIG. 6A is a perspective view of the high performance valve seat of FIG. 1.
Figure 6B:
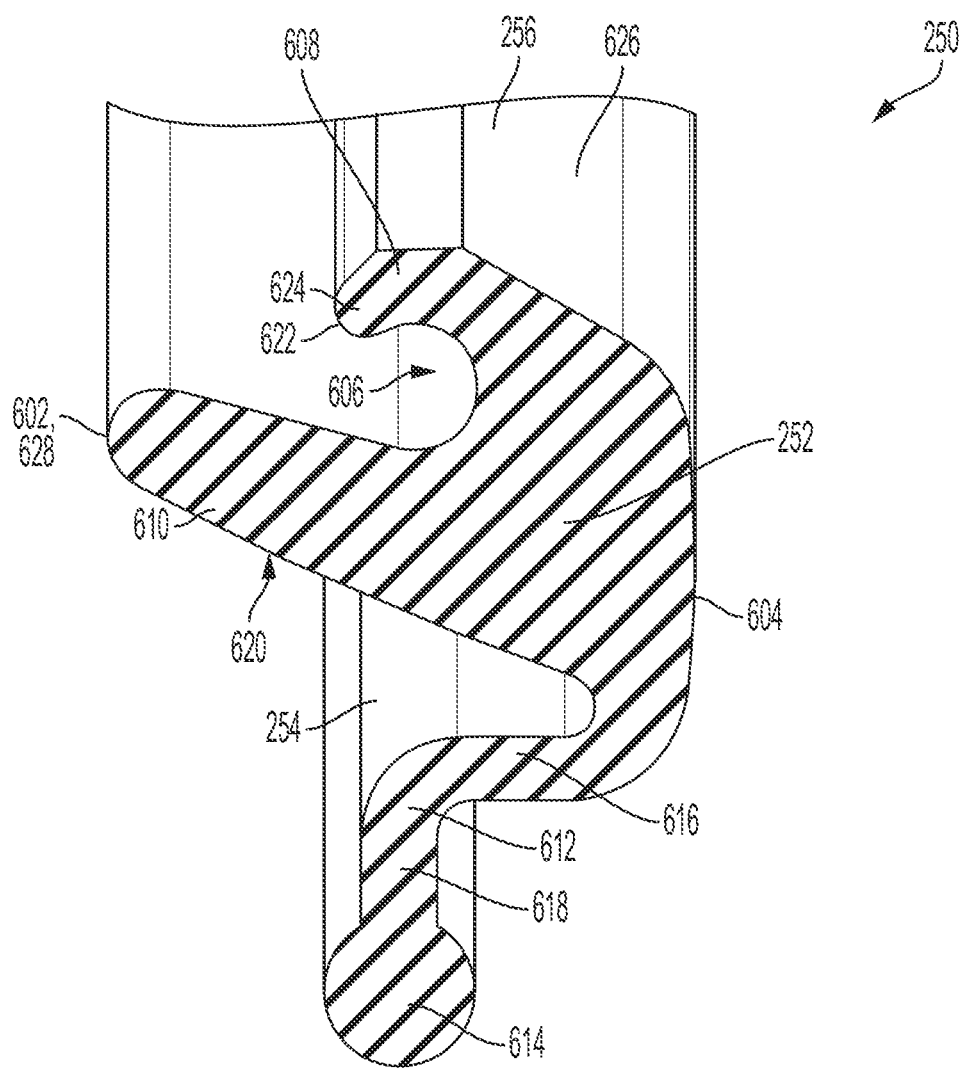
FIG. 6B is a cross-sectional view showing a lower portion of the high performance valve seat of FIG. 1, taken along line 2-2 shown in FIG. 1.

FIG. 6A illustrates a perspective view of the high performance valve seat 250 and FIG. 6B illustrates a cross-sectional view of a lower portion of the high performance valve seat 250, in accordance with an example aspect of the present disclosure. Referring to FIG. 6A, the high performance valve seat 250 can comprise the annular sealing body 252 and the circumferential sealing rib 254 extending circumferentially about the annular sealing body 252. The annular sealing body 252 can define a first seat end 602 and a second seat end 604. Example aspects of the annular sealing body 252 can define an annular spring groove 606 defined between an inner sealing flange 608 and an outer sealing flange 610. The spring groove 606 can be open towards the first seat end 602 and can be configured to receive an annular spring element 700 (shown in FIG. 7) therein. According to example aspects, the annular spring groove 606 can provide increased open space for deformation of the high performance valve seat 250. The increased space for deformation of the high performance valve seat 250 can reduce or eliminate the adverse effects of cold flow deformation (i.e., creep). With cold flow deformation, a valve seat can become permanently deformed due to the mechanical stresses imparted by a valve member. Allowing additional open space into which the high performance valve seat 250 can deform can reduce the mechanical stresses thereon, thereby reducing or eliminating cold flow deformation and prolonging the life cycle of the valve 100 (shown in FIG. 1).

Example aspects of the circumferential sealing rib 254 can comprise an annular gooseneck portion 612 and an annular bulbous portion 614. A width of the bulbous portion 614 can be greater than a width of the gooseneck portion 612. The gooseneck portion 612 can extend from substantially radially outward from an outer seat surface 620 (shown in FIG. 6B) of the annular sealing body 252, and the bulbous portion 614 can be coupled to the gooseneck portion 612 distal to the annular sealing body 252. In the present aspect, the gooseneck portion 612 can extend from the annular sealing body 252 at or near the second seat end 604.

Referring to 6B, the gooseneck portion 612 of the circumferential sealing rib 254 can define a first neck portion 616 extending substantially axially from the annular sealing body 252 at the second seat end 604 and towards the first seat end 602. The gooseneck portion 612 can further define a second neck portion 618 extending substantially radially outward from the first neck portion 616, distal to the annular sealing body 252. The bulbous portion 614 of the circumferential sealing rib 254 can be coupled to the second neck portion 618 distal to the first neck portion 616. In the present aspect, the bulbous portion 614 can define a substantially circular cross-section, as shown. In other aspects, the bulbous portion 614 can define a substantially rectangular cross-section (e.g., substantially square-shaped), as shown in FIG. 9B. In other aspects, the bulbous portion 614 can define any other suitable cross-sectional shape. As described in further detail below, the gooseneck portion 612 and the bulbous portion 614 of the circumferential sealing rib 254 can be compressed between the seat retainer 160 (shown in FIG. 1) and the inner body flange 214 (shown in FIG. 2) of the valve body 110 (shown in FIG. 1).

The annular sealing body 252 of the circumferential sealing rib 254 can define the inner seat surface 256 and an outer seat surface 620. Moreover, the annular sealing body 252 can comprise the inner sealing flange 608, the outer sealing flange 610, and the annular spring groove 606 defined therebetween. The annular spring groove 606 can define a substantially circular or rounded cross-sectional shape in the present aspect. In other aspects, the annular spring groove 606 can define a more rectangular cross-sectional shape, as shown in FIG. 10B. In other aspects, the annular spring groove 606 can define any other suitable cross-sectional shape. Other aspects of the high performance valve seat 250 may not comprise the annular spring groove 606, as shown in FIG. 10C. Furthermore, in the present aspect, a distal inner flange end 622 of the inner sealing flange 608 can define a flange lip 624 arcing radially outwards, relative to the main valve bore 116, towards the outer sealing flange 610.

According to example aspects, the inner seat surface 256 can at least partially define the inner sealing flange 608. The inner seat surface 256 can further define an annular, angled seating portion 626 that can be angled radially inward generally in the direction from the second seat end 604 towards the first seat end 602. In some aspects, the seating portion 626 can define a substantially frustoconical shape. In the present aspect, the seating portion 626 can optionally define a spherical zone. The spherical zone of the seat engagement portion 306 (shown in FIG. 3) of the butterfly disc 142 (shown in FIG. 1) can be configured to seat with the angled seating portion 626 of the high performance valve seat 250 in the closed orientation. Furthermore, the outer seat surface 620 can at least partially define the outer sealing flange 610. In example aspects, the outer seat surface 620 can be angled radially inward from the gooseneck portion 612 of the circumferential sealing rib 254 to a distal outer flange end 628 of the outer sealing flange 610. In some aspects, as shown, the outer sealing flange 610 as a whole can be angled radially inward in the direction from the first seat end 602 to the first seat end 602. The outer sealing flange 610 can extend axially beyond the inner sealing flange 608 in the present aspect. The angled outer seat surface 620 of the high performance valve seat 250 can be configured to abut the angled upper flange surface 520 of the outer retainer flange 516 (both shown in FIG. 5B). Furthermore, according to example aspects, the outer seat surface 620 can be substantially convex. Specifically, the outer seat surface 620 can be shaped as a spherical zone, which can be complimentary to the spherical zone of the angled upper flange surface 520 (shown in FIG. 5B) of the outer retainer flange 516.

Figure 7:
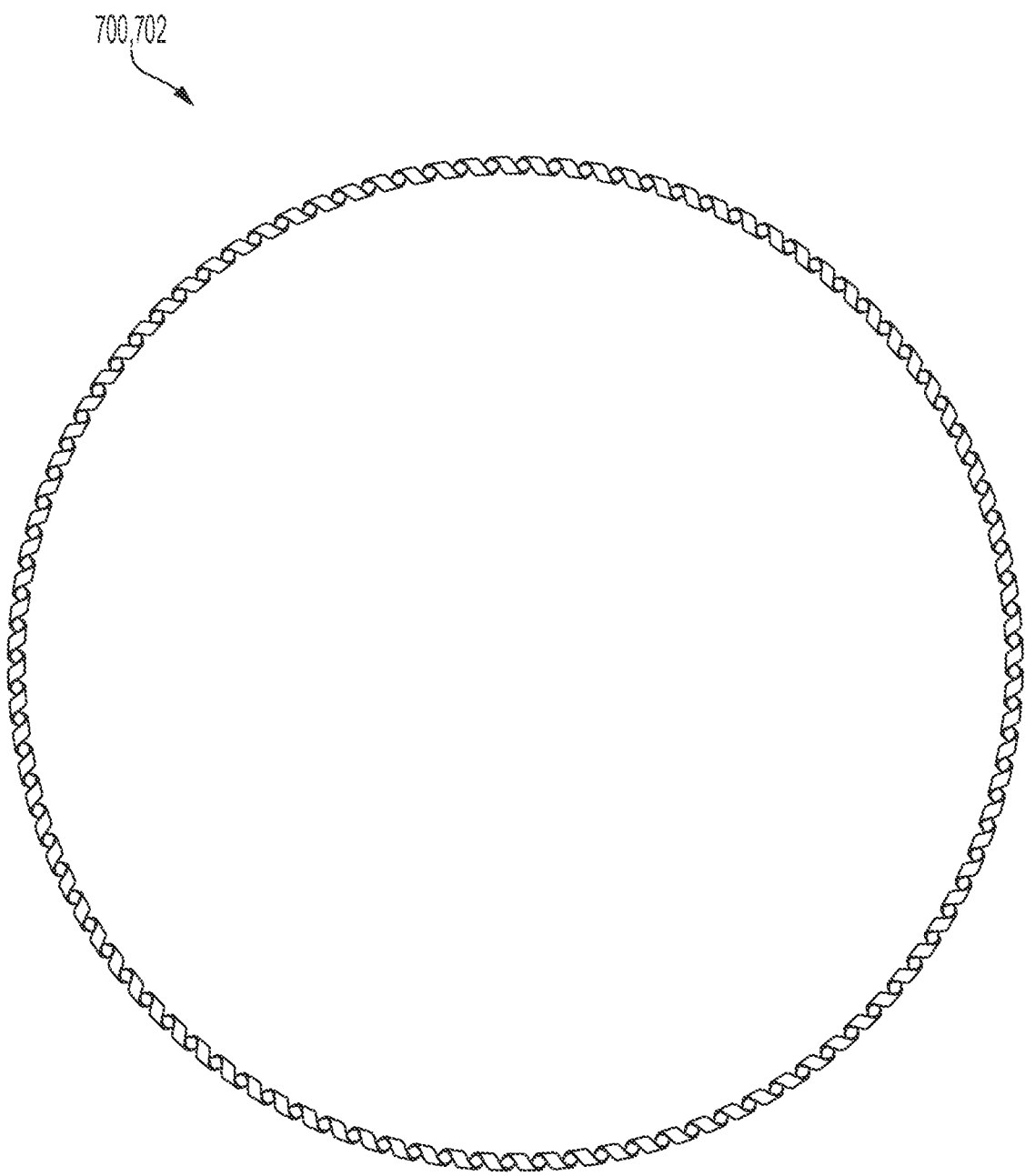
FIG. 7 is a front view of a spring of the valve of FIG. 1.

FIG. 7 illustrates the annular spring element 700 in accordance with an example aspect of the present disclosure. In the present aspect, the annular spring element 700 can be an annular helical spring 702 (i.e., a garter spring). In other aspects, the annular spring element 700 can be an annular cantilever spring 1000 (shown in FIG. 10B), which can define a substantially V-shaped cross-section or a substantially U-shaped cross-section, respectively. The annular helical spring 702 can be disposed within the annular spring groove 606 of the circumferential sealing rib 254 (both shown in FIG. 6B). The spring element 700 can comprise a resilient metal material in example aspects. In other aspects, the spring element 700 can comprise any other suitable material. According to example aspects, the annular spring element 700 can provide a continuous and consistent load force against the valve member 140 (shown in FIG. 1), which can ensure a stable and reliable seal between the valve member 140 and the high performance valve seat 250 (shown in FIG. 2).

Figure 8:
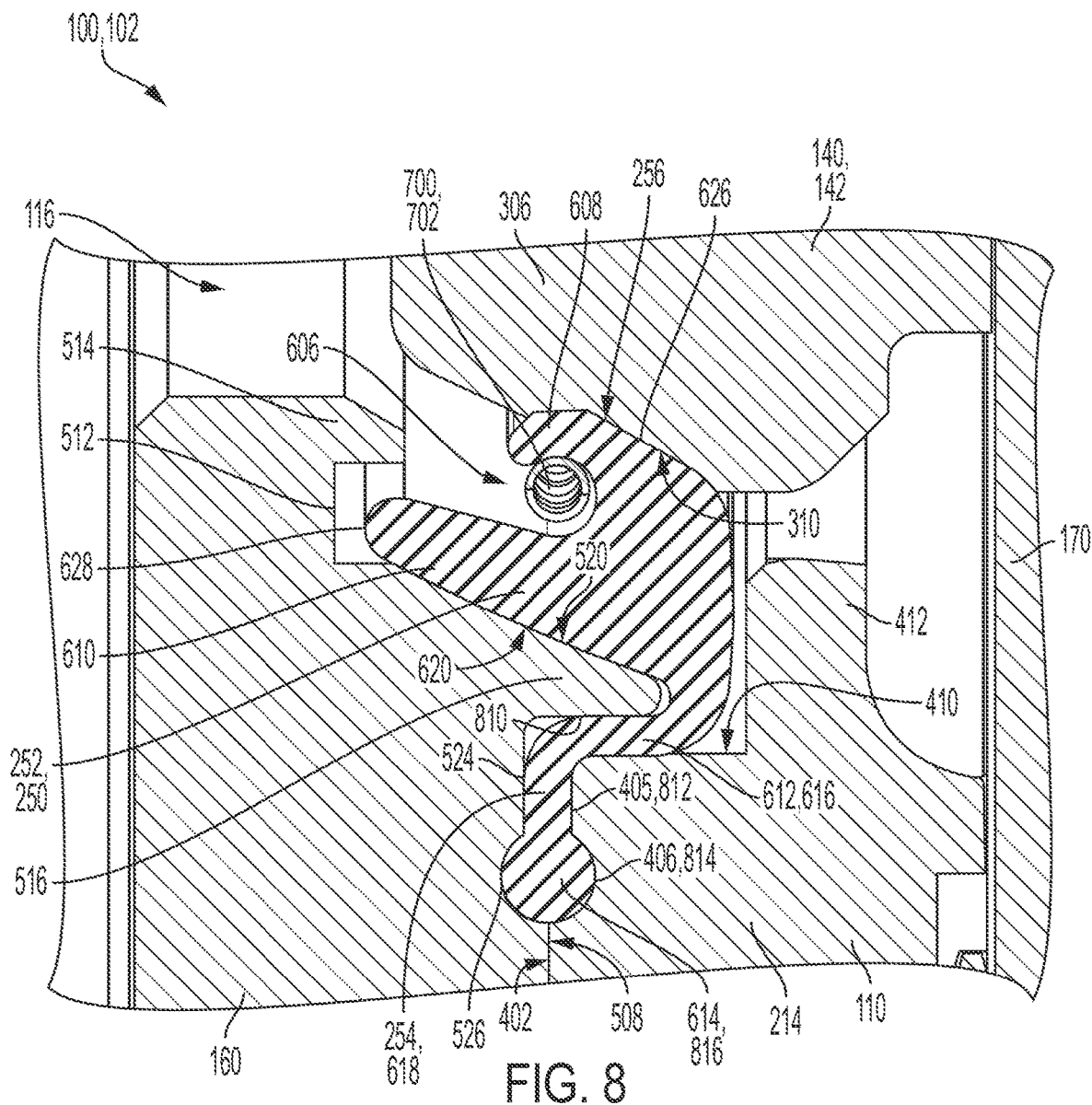
FIG. 8 is a cross-sectional view of a lower portion of the valve of FIG. 1, taken along line 2-2 shown in FIG. 1.

FIG. 8 illustrates a cross-sectional view of a lower portion of the valve 100 (i.e., the butterfly valve 102 in the present aspect). As shown, the butterfly valve 102 can comprise the valve body 110, the seat retainer 160, the valve member 140, the valve shaft 170, and the high performance valve seat 250. The high performance valve seat 250 can be retained on the valve body 110 by sandwiching the circumferential sealing rib 254 between the seat retainer 160 and the inner body flange 214 of the valve body 110. Specifically, the first neck portion 616 of the gooseneck portion 612 of the circumferential sealing rib 254 can be disposed and compressed between the top flange surface 410 of the inner body flange 214 and an underside 810 of the outer retainer flange 516 of the seat retainer 160. The second neck portion 618 of the gooseneck portion 612 can be disposed and compressed between the axially-indented retainer region 524 of the seat retainer 160 and the axially-indented body region 405 of the inner body flange 214. As shown, the axially-indented body and retainer regions 405,524 can together define a neck channel 812 therebetween for receiving the second neck portion 618. Furthermore, the bulbous portion 614 of the circumferential sealing rib 254 can be disposed and compressed between the annular retainer groove 526 of the seat retainer 160 and the annular body groove 406 of the inner body flange 214. Thus, the annular retainer groove 526 and the annular body groove 406 can together define a bulbous groove 814 therebetween for receiving the bulbous portion 614. The bulbous groove 814 can define a substantially circular cross-sectional shape in the present aspect.

According to example aspects, the valve member 140 can compress the bulbous portion 614 of the circumferential sealing rib 254 into the bulbous groove 814. The bulbous groove 814 can be configured to control, or limit, deformation of the high performance valve seat 250 within the bulbous groove 814 to create a compressed region 816 therein. The bulbous groove 814 can partially confine the compressed region 816 in both the radial and axial directions, thereby maintaining a high degree of compressive stress in the compressed region 816. Specifically, the compressed region 816 can be maintained in a three-dimensional compressive state, which can provide a stable and reliable seal between the high performance valve seat 250 and the valve member 140. Additionally, because the contact surface of the bulbous portion 614 with the valve body 110 and the seat retainer 160 is minimal, a lessor tightening force is required when securing the seat retainer 160 to the valve body 110 with the bulbous portion 614 sandwiched therebetween.

In example aspects, the second seat end 604 of the annular sealing body 252 can confront the annular flange rib 412 of the inner body flange 214. The angled outer seat surface 620 of the annular sealing body 252 can extend along the angled upper flange surface 520 of the outer retainer flange 516, and the distal outer flange end 628 of the outer sealing flange 610 can engage the upper notch 512 of the seat retainer 160. According to example aspects, the spherical zone of the outer seat surface 620 can be mated with the spherical zone of the upper flange surface 520. Contact between the convex shape of the outer seat surface 620 and the complimentary concave shape of the upper flange surface 520 can reduce the rotational torque from friction required to rotate the valve member 140 against the high performance valve seat 250. Additionally, the concave shape of the upper flange surface 520 can prevent the high performance valve seat 250 from shifting when the valve 100 is pressurized because the concave upper flange surface 520 can receive and center the convex shape of the outer seat surface 620.

The annular helical spring 702 can be disposed in the spring groove 606 between the inner sealing flange 608 and the outer sealing flange 610. As shown, the seat engagement portion 306 of the butterfly disc 142 can engage and seal with the inner seat surface 256 of the annular sealing body 252 to prohibit fluid flow through the main valve bore 116 in the closed orientation of the butterfly disc 142. Specifically, the annular seat engagement surface 310 of the seat engagement portion 306 of the butterfly disc 142 can engage and seal with the angled seating portion 626 of the inner seat surface 256 of the high performance valve seat 250. The annular sealing body 252 can be compressed between the butterfly disc 142 and the seat retainer 160 in the closed orientation, and the annular helical spring 702 can provide continuous and consistent resistance to the compression, thereby improving the seal between the high performance valve seat 250 and the butterfly disc 142 and between the high performance valve seat 250 and the seat retainer 160.

According to example aspects, the spherical zone of the seat engagement surface 310 of the valve member 140 (i.e., the butterfly disc 142) can be mated with the spherical zone of the angled seating portion 626 of the inner seat surface 256 of the high performance valve seat 250. Contact between the convex shape of the seat engagement surface 310 and the concave shape of the seating portion 626 of the inner seat surface 256 can reduce the rotational torque from friction required to rotate the valve member 140 against the high performance valve seat 250. Additionally, the concave shape of the angled seating portion 626 can prevent the high performance valve seat 250 and the valve member 140 from shifting when the valve 100 is pressurized because the concave portion can receive and center the convex shape of the seat engagement surface 310.

Figure 9A:
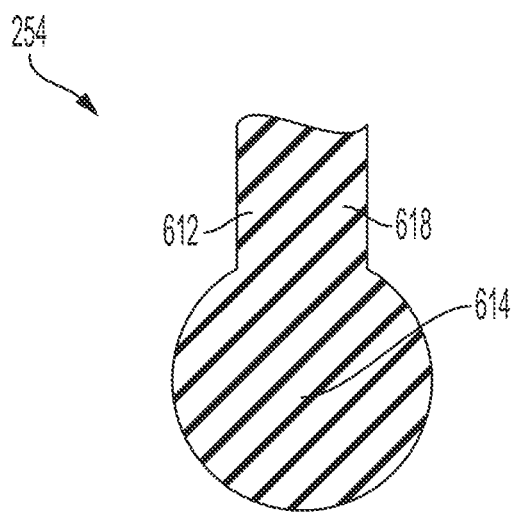
FIG. 9A is a cross-sectional view of a sealing rib of the high performance valve seat of FIG. 1, taken along line 2-2 shown in FIG. 1.
Figure 9B:
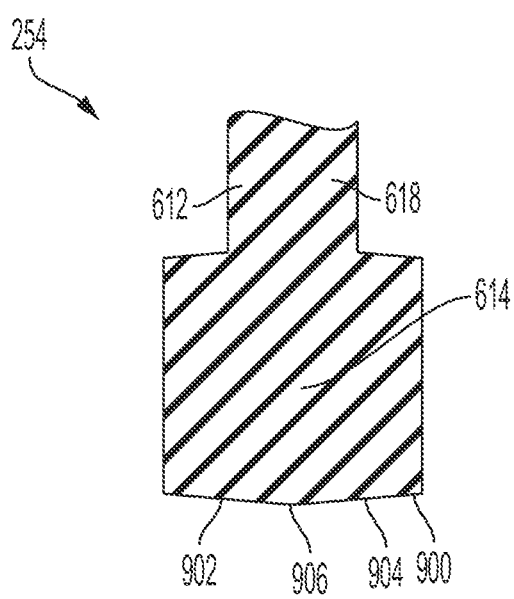
FIG. 9B is a cross-sectional view of the sealing rib of the high performance valve seat in accordance with another aspect of the present disclosure.

FIGS. 9A and 9B illustrate different cross-sectional shapes of the bulbous portion 614 of the circumferential sealing rib 254 of the high performance valve seat 250. In one aspect, as shown in FIG. 9A, the bulbous portion 614 can define a substantially circular cross-sectional shape. In another aspect, as shown in FIG. 9B, the bulbous portion 614 can define a substantially rectangular cross-sectional shape. Specifically, the cross-sectional shape of the bulbous portion 614 can be substantially square-shaped in the present aspect. In some aspects, a lower surface 900 of the bulbous portion 614 can define a first angled surface portion 902 and a second angled surface portion 904. Each of the first and second angled surface portions 902,904 can be angled slightly outward from the bulbous portion 614 and can meet at an apex 906, as shown. In other aspects, the bulbous portion 614 of the circumferential sealing rib 254 can define any other suitable cross-sectional shape.

Figure 10A:
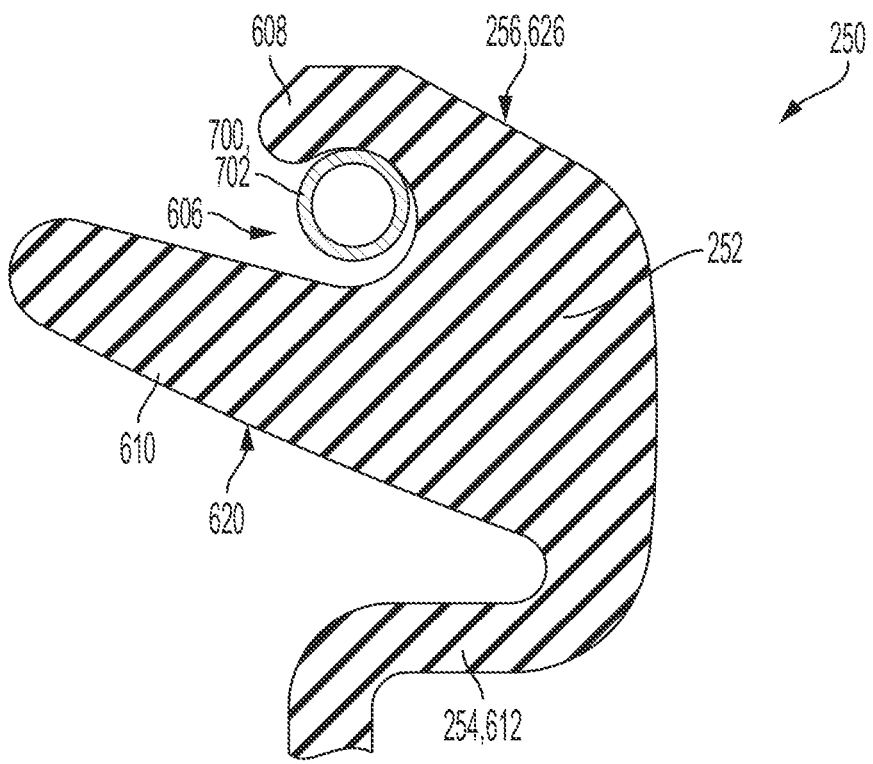
FIG. 10A is a cross-sectional view of a sealing body of the high performance valve seat, taken along line 2-2 shown in FIG. 1, wherein the spring of FIG. 7 is nested within a groove of the high performance valve seat.
Figure 10B:
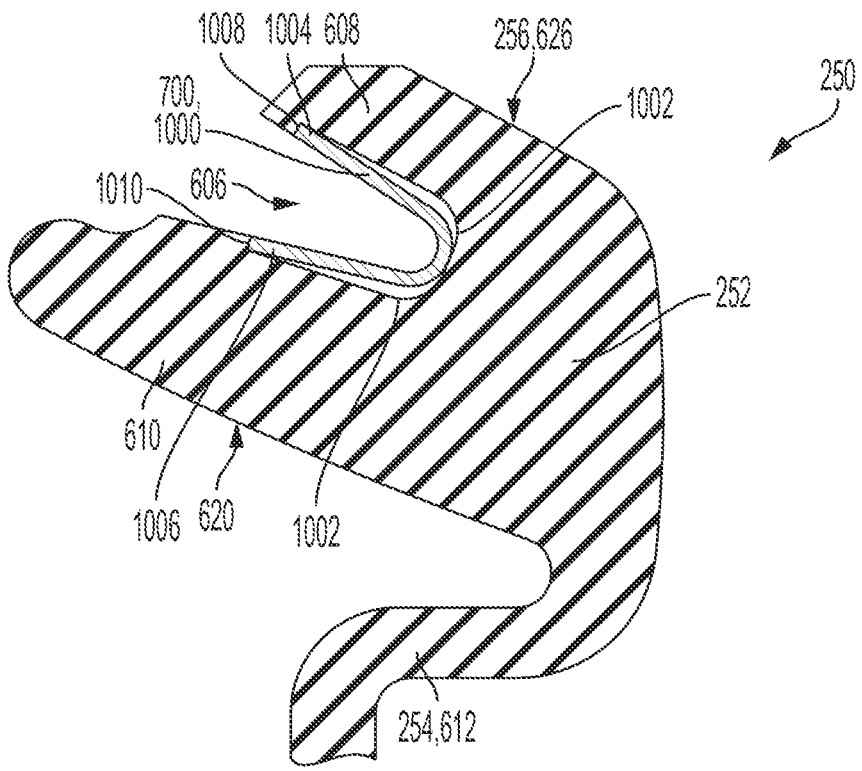
FIG. 10B is a cross-sectional view of the spring nested in the groove of the high performance valve seat, in accordance with another aspect of the present disclosure.
Figure 10C:
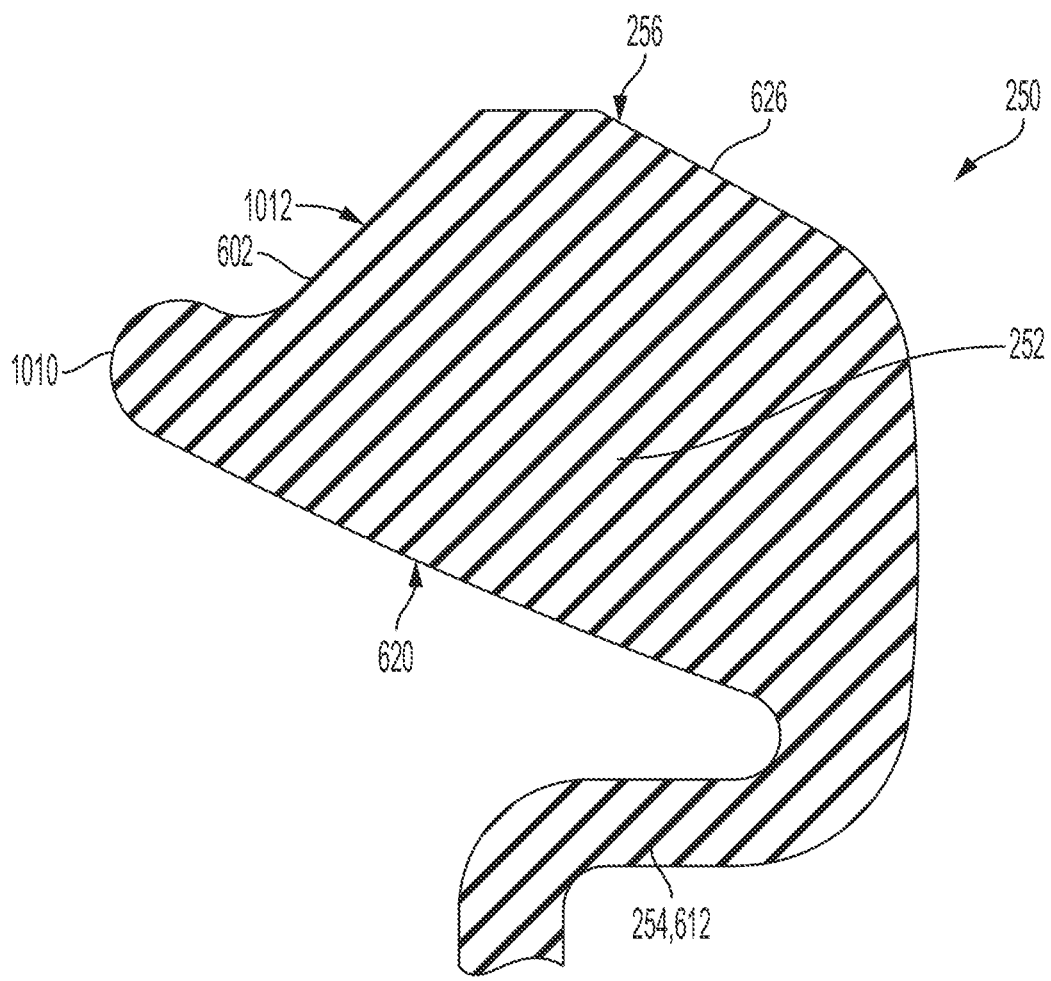
FIG. 10C is a cross-sectional view of the sealing body of the high performance valve seat in accordance with another aspect of the present disclosure.

FIGS. 10A-10C illustrate different cross-sectional shapes of the annular sealing body 252 of the circumferential sealing rib 254 of the high performance valve seat 250. In one aspect, as shown in FIG. 10A, the annular sealing body 252 can define the inner seat surface 256 and the outer seat surface 620. The annular sealing body 252 can comprise the inner sealing flange 608, the outer sealing flange 610, and the annular spring groove 606 defined therebetween. The annular spring groove 606 can be configured to receive the annular spring element 700 therein. The annular spring groove 606 can define a substantially circular cross-sectional shape. The annular spring element 700 can be the annular helical spring 702, which can be disposed within the annular spring groove 606 of the circumferential sealing rib 254. In some aspects, as shown, the distal inner flange end 622 of the inner sealing flange 608 can define the flange lip 624 arcing radially outwards, relative to the main valve bore 116 (shown in FIG. 1) towards the outer sealing flange 610.

In another aspect, as shown in FIG. 10B, the annular spring groove 606 can define a less circular and more rectangular cross-sectional shape. In the present aspect, inner corners 1002 of the annular spring groove 606 can be rounded, such that the annular spring groove 606 can define a substantially U-shaped cross-sectional shape. The annular spring element 700 disposed within the annular spring groove 606 can be an annular cantilever spring 1000 defining a substantially U-shaped cross-section. In example aspects, the annular cantilever spring 1000 can define an annular inner free end 1004 configured to engage an annular inner shoulder 1008 of the high performance valve seat 250 and an annular outer free end 1006 configured to engage an annular outer shoulder 1010 of the high performance valve seat 250 to retain the cantilever spring 1000 within the spring groove 606. Furthermore, in the present aspect, the inner sealing flange 608 can be substantially linear and does not define the flange lip 624 arcing towards the outer sealing flange 610.

In other aspects, the annular spring groove 606 can define a substantially V-shaped cross-sectional shape and/or the spring element 700 disposed within the annular spring groove 606 can be an annular cantilever spring 1000 defining a substantially V-shaped cross-sectional shape. In other aspects, the annular spring groove 606 and the spring element 700 can define any other suitable cross-sectional shape.

In other aspects, such as the aspect depicted in FIG. 10C, the annular sealing body 252 may not define the annular spring groove 606. The annular sealing body 252 of the present aspect further does not define the inner sealing flange 608 and the outer sealing flange 610 (both shown in FIG. 6A). Rather, the annular sealing body 252 can define an engagement lip 1010 at the first seat end 602. In the present aspect, the engagement lip 1010 can be partially defined by the outer seat surface 620. Similar to the distal outer flange end 628 (shown in FIG. 6B) of the outer sealing flange 610, the engagement lip 1010 can be configured to engage the annular upper notch 512 (shown in FIG. 5A) of the seat retainer 160 (shown in FIG. 1). The annular sealing body 252 can further define a substantially planar first end surface 1012 formed at the first seat end 602 and extending between the engagement lip 1010 and the inner seat surface 256.

According to example aspects, a method of installing the high performance valve seat 250 with the valve 100 can comprise disposing the circumferential sealing rib 254 of the high performance valve seat 250 between the valve body 110 and the seat retainer 160. The method can further comprise fastening the seat retainer 160 to the valve body 110 to compress the circumferential sealing rib 254 therebetween. In some aspects, the circumferential sealing rib 254 can define the bulbous portion 614, the valve body 110 and the seat retainer 160 can define the bulbous groove 814 therebetween, and disposing the circumferential sealing rib 254 between the valve body 110 and the seat retainer 160 can comprise disposing the bulbous portion 614 within the bulbous groove 814. Furthermore, in some aspects, the circumferential sealing rib 254 can further define the gooseneck portion 612, the valve body 110 and the seat retainer 160 can further define the neck channel 812 therebetween, and disposing the circumferential sealing rib 254 between the valve body 110 and the seat retainer 160 can further comprise disposing the second neck portion 618 of the gooseneck portion 612 within the neck channel 812. In some aspects, fastening the seat retainer 160 to the valve body 110 to compress the circumferential sealing rib 254 therebetween can comprise receiving a fastener through each corresponding pair of retainer fastener holes 162 and flange fastener holes 404 and tightening the fasteners to draw the seat retainer 160 towards the valve body 110.

Additionally, a method of operating the valve 100 can comprise moving the valve member 140 from the open orientation to the closed orientation and sealing the valve member 140 with the high performance valve seat 250 in the closed orientation to prohibit fluid flow through the valve 100. In example aspects, sealing the valve member 140 with the high performance valve seat 250 can comprise sealing the inner seat surface 256 of the high performance valve seat 250 with the seat engagement surface 310 of the valve member 140. The method can further comprise moving the valve member 140 from the closed orientation to the open orientation and unsealing the valve member 140 from the high performance valve seat 250 to permit fluid flow through the valve 100.

In one exemplary aspect, a valve seat can comprise an annular sealing body that can define an inner seat surface and an outer seat surface, and the inner seat surface can define an annular seating portion configured to seat with a valve member. The valve seat can further comprise a circumferential sealing rib that can extend circumferentially about the annular sealing body, and the circumferential sealing rib can define a gooseneck portion coupled to the annular sealing body and a bulbous portion coupled to the gooseneck portion opposite the annular sealing body.

In a further exemplary aspect, the valve seat can define an axis extending centrally therethrough, and the circumferential sealing rib can extend substantially radially outward from the annular sealing body. In a further exemplary aspect, the gooseneck portion of the circumferential sealing rib can define a first neck portion and a second neck portion, the first neck portion can extend from the annular sealing body in a substantially axial direction, and the second neck portion can extend substantially radially outward from the first neck portion, about perpendicular to the first neck portion. In a further exemplary aspect, a width of the bulbous portion can be greater than a width of the gooseneck portion. In a further exemplary aspect, the bulbous portion can define a substantially circular cross-sectional shape. In a further exemplary aspect, the bulbous portion can define a substantially rectangular cross-sectional shape. In a further exemplary aspect, the outer seat surface of the annular sealing body can define a spherical zone. In a further exemplary aspect, the annular seating portion can define a spherical zone. In a further exemplary aspect, the annular sealing body can define an inner sealing flange and an outer sealing flange, an annular spring groove can be defined between the inner sealing flange and the outer sealing flange, and the annular spring groove can be configured to receive a spring therein. In a further exemplary aspect, the outer seat surface can at least partially define the outer sealing flange, and the inner seat surface can at least partially define the inner sealing flange. In a further exemplary aspect, the outer sealing flange can extend axially beyond the inner sealing flange. In a further exemplary aspect, the spring can be one of an annular helical spring and an annular cantilever spring.

In another exemplary aspect, a valve can comprise a valve body that can define a main valve bore, a valve member that can be disposed within the main valve bore and can be movable between an open orientation and a closed orientation, a seat retainer that can be mounted to the valve body, and a valve seat that can comprise an annular sealing body and a circumferential sealing rib. At least a portion of the circumferential sealing rib can be compressed between the valve body and the seat retainer. The valve member can define a seat engagement surface, and the annular sealing body can define an inner seat surface configured to seal with the seat engagement surface in the closed orientation.

In a further exemplary aspect, the valve body can define an annular body groove, the seat retainer can define an annular retainer groove, the annular body groove and the annular retainer groove can together define a bulbous groove, and the circumferential sealing rib can define a bulbous portion compressed within the bulbous groove. In a further exemplary aspect, the circumferential sealing rib can further define a gooseneck portion coupled to the annular sealing body, the bulbous portion can be coupled to the gooseneck portion opposite the annular sealing body, the valve body can define an annular axially-indented body region connected to the annular body groove, the seat retainer can define an annular axially-indented retainer region connected to the annular retainer groove, and the annular axially-indented body region and the annular axially-indented retainer region can together define a neck channel within which at least a portion of the gooseneck portion can be compressed. In a further exemplary aspect, the gooseneck portion of the circumferential sealing rib can define a first neck portion extending from the annular sealing body in a substantially axial direction; the gooseneck portion can further define a second neck portion extending substantially radially outward from the first neck portion and about perpendicular to the first neck portion, and the second neck portion can be compressed within the neck channel. In a further exemplary aspect, the bulbous portion can define a substantially circular cross-sectional shape. In a further exemplary aspect, the bulbous portion can define a substantially rectangular cross-sectional shape. In a further exemplary aspect, the annular sealing body can further define an outer seat surface, and the outer seat surface can define a convex spherical zone. The seat retainer can defines a retainer flange, and the retainer flange can define an upper flange surface. The upper flange surface can define a concave spherical zone complimentary to and receiving the convex spherical zone of the outer seat surface. In a further exemplary aspect, the inner seat surface can define an annular seating portion configured to seal with the seat engagement surface of the valve member in the closed orientation; the annular seating portion can define a concave spherical zone, and the seat engagement surface can define a convex spherical zone complimentary to the concave spherical zone of the annular seating portion. In a further exemplary aspect, the annular sealing body can define an inner sealing flange and an outer sealing flange, an annular spring groove can be defined between the inner sealing flange and the outer sealing flange, and the valve can further comprise an annular spring received within the annular spring groove. In a further exemplary aspect, the outer seat surface can at least partially define the outer sealing flange, a distal outer flange end of the outer sealing flange can engage an annular notch of the seat retainer, and the annular notch can be at least partially defined by the upper flange surface of the retainer flange.

In another exemplary aspect, a valve seat can comprise a sealing body defining a seating portion configured to seat with a valve member. The valve seat can further comprise a sealing rib extending circumferentially about the annular sealing body. The sealing rib can define a bulbous portion.

One should note that conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more particular embodiments or that one or more particular embodiments necessarily include logic for deciding, with or without user input or prompting, whether these features, elements and/or steps are included or are to be performed in any particular embodiment.

It should be emphasized that the above-described embodiments are merely possible examples of implementations, merely set forth for a clear understanding of the principles of the present disclosure. Any process descriptions or blocks in flow diagrams should be understood as representing modules, segments, or portions of code which include one or more executable instructions for implementing specific logical functions or steps in the process, and alternate implementations are included in which functions may not be included or executed at all, may be executed out of order from that shown or discussed, including substantially concurrently or in reverse order, depending on the functionality involved, as would be understood by those reasonably skilled in the art of the present disclosure. Many variations and modifications may be made to the above-described embodiment(s) without departing substantially from the spirit and principles of the present disclosure. Further, the scope of the present disclosure is intended to cover any and all combinations and sub-combinations of all elements, features, and aspects discussed above. All such modifications and variations are intended to be included herein within the scope of the present disclosure, and all possible claims to individual aspects or combinations of elements or steps are intended to be supported by the present disclosure.

What is claimed is:

1. A valve seat comprising:
an annular sealing body defining an inner sealing flange defining an inner seat surface, an outer sealing flange defining an outer seat surface, and an annular spring groove defined between the inner sealing flange and the outer sealing flange, the inner seat surface defining an annular seating portion configured to seat with a valve member; and
a circumferential sealing rib extending circumferentially about the annular sealing body, the circumferential sealing rib defining a gooseneck portion coupled to the annular sealing body and a bulbous portion coupled to the gooseneck portion opposite the annular sealing body,
wherein the outer seat surface of the annular sealing body defines a spherical zone.

2. The valve seat of claim 1, wherein:
the valve seat defines an axis extending centrally therethrough; and
the circumferential sealing rib extends substantially radially outward from the annular sealing body.

3. The valve seat of claim 2, wherein:
the gooseneck portion of the circumferential sealing rib defines a first neck portion and a second neck portion;
the first neck portion extends from the annular sealing body in a substantially axial direction; and
the second neck portion extends substantially radially outward from the first neck portion, about perpendicular to the first neck portion.

4. The valve seat of claim 2, wherein a width of the bulbous portion is greater than a width of the gooseneck portion.

5. The valve seat of claim 4, wherein the bulbous portion defines a substantially circular cross-sectional shape.

6. The valve seat of claim 4, wherein the bulbous portion defines a substantially rectangular cross-sectional shape.

7. The valve seat of claim 1, wherein the annular seating portion defines a spherical zone.

8. The valve seat of claim 7, wherein the annular spring groove is configured to receive a spring therein.

9. The valve seat of claim 8, wherein the outer sealing flange extends axially beyond the inner sealing flange.

10. The valve seat of claim 8, wherein the spring is one of an annular helical spring and an annular cantilever spring.

11. A valve seat comprising:
an annular sealing body defining an inner seat surface and an outer seat surface, the inner seat surface defining an annular seating portion configured to seat with a valve member; and
a circumferential sealing rib extending circumferentially about the annular sealing body, the circumferential sealing rib defining a gooseneck portion coupled to the annular sealing body and a distal end portion coupled to the gooseneck portion opposite the annular sealing body;
wherein the outer seat surface of the annular sealing body defines a spherical zone;
wherein the annular seating portion defines a spherical zone; and
wherein the annular sealing body defines an inner sealing flange and an outer sealing flange, an annular spring groove defined between the inner sealing flange and the outer sealing flange, the annular spring groove configured to receive a spring therein.

12. The valve seat of claim 11, wherein:
the valve seat defines an axis extending centrally therethrough; and
the circumferential sealing rib extends substantially radially outward from the annular sealing body.

13. The valve seat of claim 12, wherein:
the gooseneck portion of the circumferential sealing rib defines a first neck portion and a second neck portion;
the first neck portion extends from the annular sealing body in a substantially axial direction; and
the second neck portion extends substantially radially outward from the first neck portion, about perpendicular to the first neck portion.

14. The valve seat of claim 12, wherein a width of the distal end portion is greater than a width of the gooseneck portion.

15. The valve seat of claim 14, wherein the distal end portion defines a substantially circular cross-sectional shape.

16. The valve seat of claim 14, wherein the distal end portion defines a substantially rectangular cross-sectional shape.

17. The valve seat of claim 11, wherein the outer seat surface at least partially defining the outer sealing flange, and wherein the inner seat surface at least partially defines the inner sealing flange.

18. The valve seat of claim 11, wherein the outer sealing flange extends axially beyond the inner sealing flange.

19. The valve seat of claim 11, wherein the spring is one of an annular helical spring and an annular cantilever spring.

* * * * *